(12) United States Patent
Taylor et al.

(10) Patent No.: US 8,953,572 B2
(45) Date of Patent: Feb. 10, 2015

(54) MOBILE COMMUNICATION DEVICE, MOBILE NETWORK SHARING METHOD AND ELECTRONIC DEVICE

(75) Inventors: Matthew W. Taylor, Bellevue, WA (US); Hsin-Ti Chueh, Taoyuan (TW); Chia-Wei Chen, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 30 days.

(21) Appl. No.: 13/111,238

(22) Filed: May 19, 2011

(65) Prior Publication Data

US 2012/0051344 A1 Mar. 1, 2012

Related U.S. Application Data

(60) Provisional application No. 61/377,794, filed on Aug. 27, 2010.

(51) Int. Cl.
*H04W 74/00* (2009.01)
*H04B 7/185* (2006.01)
*H04W 48/18* (2009.01)
*H04W 52/02* (2009.01)
*H04W 88/06* (2009.01)

(52) U.S. Cl.
CPC .......... *H04W 48/18* (2013.01); *H04W 52/0225* (2013.01); *H04W 88/06* (2013.01)
USPC .......................................... 370/338; 370/318

(58) Field of Classification Search
CPC .................................................. H04W 28/021
USPC ........................................................ 370/338
See application file for complete search history.

(56) References Cited

U.S. PATENT DOCUMENTS 7,519,363 B2 4/2009 Shin et al.
2002/0126013 A1* 9/2002 Bridgelall .................. 340/572.1
(Continued)

FOREIGN PATENT DOCUMENTS

CN 1625868 A 6/2005
CN 1711717 A 12/2005
(Continued)

OTHER PUBLICATIONS

European Search Report dated Oct. 28, 2011.
(Continued)

*Primary Examiner* — Gerald Smarth
(74) *Attorney, Agent, or Firm* — McClure, Qualey & Rodack, LLP

(57) ABSTRACT

The invention discloses a mobile communication device, an electronic device and a mobile network sharing method between these two devices. The mobile communication device includes a communication module and a control unit. The communication module includes a mobile communication unit and a local communication unit. The mobile communication unit is used for connecting to a mobile communication network. The local communication unit has an active mode and a passive mode. The control unit is coupled to the communication module. When a trigger signal from an electronic device is received by the local communication unit under the passive mode, the control unit switches the local communication unit into the active mode, so as to connect the electronic device to the mobile communication network via the local communication unit and the mobile communication unit.

13 Claims, 4 Drawing Sheets

(56) References Cited

U.S. PATENT DOCUMENTS

| | | |
|---|---|---|
| 2003/0210700 A1* | 11/2003 | Chen .............................. 370/401 |
| 2004/0259542 A1 | 12/2004 | Viitamaki et al. |
| 2005/0088997 A1* | 4/2005 | Melpignano ................. 370/338 |
| 2005/0286476 A1* | 12/2005 | Crosswy et al. .............. 370/338 |
| 2006/0031515 A1 | 2/2006 | Van Gassel et al. |
| 2007/0030824 A1* | 2/2007 | Ribaudo et al. ............... 370/328 |
| 2007/0135162 A1* | 6/2007 | Banerjea et al. ........... 455/556.1 |
| 2007/0165557 A1* | 7/2007 | Donovan ...................... 370/318 |
| 2007/0265009 A1* | 11/2007 | Hamaguchi ................... 455/436 |
| 2009/0017789 A1* | 1/2009 | Thomas et al. ............... 455/406 |
| 2009/0143059 A1* | 6/2009 | Britt, Jr. et al. ............... 455/419 |
| 2010/0008339 A1 | 1/2010 | Huang |
| 2010/0219250 A1* | 9/2010 | Wang ........................ 235/462.43 |
| 2010/0245931 A1* | 9/2010 | Sato .............................. 358/407 |

FOREIGN PATENT DOCUMENTS

| | | |
|---|---|---|
| CN | 1816789 A | 8/2006 |
| CN | 101626635 A | 1/2010 |

OTHER PUBLICATIONS

China Office Action dated Jul. 3, 2013.
English translation of abstract of CN 1625868A (published Jun. 8, 2005).
English translation of abstract of CN 101626635 A (published Jan. 13, 2010).
English translation of abstract of CN 1816789 A (published Aug. 9, 2006).
English translation of abstract of CN 1711717 A (published Dec. 21, 2005).

* cited by examiner

MOBILE COMMUNICATION DEVICE, MOBILE NETWORK SHARING METHOD AND ELECTRONIC DEVICE

RELATED APPLICATIONS

This application claims priority to U.S. Provisional Application Ser. No. 61/377,794, filed Aug. 27, 2010, which is herein incorporated by reference.

BACKGROUND

1. Field of Invention

The present disclosure relates to a mobile communication device. More particularly, the present disclosure relates to a mobile communication device, an electronic device and a mobile network sharing method in between.

2. Description of Related Art

Recently, the mobile communication device has become a necessary in our daily life, e.g. cellar phone, personal digital assistant, tablet computer, internet computer, notebook computer, etc. With the rocketing development of the digital communication technology, users usually utilize mobile communication device to browse websites, share files, or send multimedia messages through a mobile network or a wireless communication system.

Besides, people usually utilize the mobile communication device to serve as a mobile network station. The mobile network sharing function of the mobile communication device is switched on, so as to share the mobile network bandwidth of the mobile communication device with other electronic devices. These electronic devices may connect to the mobile communication device via a local network connection (e.g. Wi-Fi connection) and utilize the mobile communication device as a redirect-gateway for connecting to the internet. The bandwidth sharing technology enables the mobile communication device to serve as a portable wireless access point (AP). The bandwidth sharing technology is popular among consumers because it is user friendly, affordable and free from carrying extra wireless network adaptor or router.

However, the mobile communication device in general does not stay in wireless AP mode over a long time. Otherwise, the electricity of the mobile communication device would be consumed quickly, such that the battery durability of the mobile communication device would be reduced.

In other words, the Wi-Fi function of the mobile communication device operates under a passive client mode in default. When user demands for wireless network access (e.g. user wants to connect their notebook computer to the internet through the mobile communication device), the user needs to enter the configuration interface on the mobile communication device and switch on network sharing function manually, such that the Wi-Fi function of the mobile communication device is switched to operate under an active wireless AP mode. Afterward, the user may need to manipulate on the interface of the notebook computer for completing the network configuration. The whole setup procedure is complex, time-consuming and not friendly to a common user.

SUMMARY

In order to solve the aforesaid problem, this disclosure discloses a mobile communication device, an electronic device and a mobile network sharing method in between. When user demands for wireless network access, the user may manipulate the electronic device, e.g. a notebook computer, a handheld smart device or a tablet computer, for sending a specific trigger signal to the mobile communication device via a local communication network. When the mobile communication device receives the trigger signal, the mobile communication device is switched into an active mode for sharing the bandwidth of its mobile communication network with the electronic device. Accordingly, the network sharing configuration can be switched easily. In an embodiment, all of the configuration setting can be completed on the electronic device remotely without involving any manipulation on the mobile electronic device.

Therefore, an aspect of the invention is to provide a mobile communication device, which includes a communication module and a control unit. The communication module includes a mobile communication unit and a local communication unit. The mobile communication unit is used for connecting to a mobile communication network. The local communication unit has a passive mode and an active mode. The control unit is coupled with the communication module. When a trigger signal from an electronic device is received by the local communication unit under the passive mode, the control unit switches the local communication unit into the active mode, so as to connect the electronic device to the mobile communication network through the local communication unit and the mobile communication unit.

According to an embodiment of the invention, the local communication unit under the passive mode receives the trigger signal from the electronic device via a point-to-point connection. In the embodiment, the point-to-point connection includes an Ad Hoc connection. In addition, the mobile communication device may establish the point-to-point connection to the electronic device according to a Media Access Control (MAC) address of the electronic device.

According to an embodiment of the invention, the mobile communication network can be based on 2G mobile communication technology, 3G mobile communication technology, 3.5 mobile communication technology or 4G mobile communication technology.

According to an embodiment of the invention, the local communication unit can be based on Wireless Fidelity (Wi-Fi) communication technology. In the embodiment, the trigger signal is a Wi-Fi packet, and the Wi-Fi packet comprises a specific Service Set Identifier (SSID).

According to an embodiment of the invention, the mobile communication device is equivalently served as a wireless access point (AP) when the local communication unit is under the active mode.

Another aspect of the invention is to provide a mobile network sharing method, which is suitable for a mobile communication device. The mobile network sharing method includes steps of: activating a local communication unit under a passive mode; judging whether a trigger signal from an electronic device is received through the local communication unit under the passive mode; linking to a mobile communication network and switching the local communication unit into an active mode when the trigger signal is received; and, connecting the electronic device to the mobile communication network through the local communication unit.

According to an embodiment of the invention, in step of receiving the trigger signal through the local communication unit, the mobile communication device receives the trigger signal via a point-to-point connection. In the embodiment, the point-to-point connection includes an Ad Hoc connection. In addition, the point-to-point connection to the electronic device is established according to a Media Access Control (MAC) address of the electronic device.

According to an embodiment of the invention, the mobile communication network is based on 2G mobile communication technology, 3G mobile communication technology, 3.5 mobile communication technology or 4G mobile communication technology.

According to an embodiment of the invention, the local communication unit is based on Wireless Fidelity (Wi-Fi) communication technology. In this embodiment, the trigger signal can be a Wi-Fi packet, and the Wi-Fi packet comprises a specific Service Set Identifier (SSID).

Another aspect of the invention is to provide an electronic device, which includes a local communication unit and a control unit. The control unit is coupled with the local communication unit. The control unit utilizes the local communication unit to search and judge whether there is an accessible wireless access point. The control unit utilizes the local communication unit to transmit a trigger signal to a mobile communication device when there is no accessible wireless access point, so as to enable the electronic device for connecting to a mobile communication network through the mobile communication device.

According to an embodiment of the invention, the local communication unit receives the trigger signal from the electronic device via a point-to-point connection. In the embodiment, the point-to-point connection includes an Ad Hoc connection. In addition, the electronic device establishes the point-to-point connection to the mobile communication device according to a Media Access Control (MAC) address of the mobile communication device.

According to an embodiment of the invention, the trigger signal is a Wi-Fi packet, and the Wi-Fi packet comprises a specific Service Set Identifier (SSID).

BRIEF DESCRIPTION OF THE DRAWINGS

The invention can be more fully understood by reading the following detailed description of the embodiment, with reference made to the accompanying drawings as follows.

DETAILED DESCRIPTION

In this disclosure, a mobile communication device, an electronic device and a mobile network sharing method in between are disclosed. When the users need to access the wireless network, they may manipulate the electronic device, e.g. a notebook computer, a handheld smart device or a tablet computer, to send a specific trigger signal to the mobile communication device via a local communication network. When the mobile communication device receives the trigger signal, the mobile communication device is switched into an active mode for sharing the bandwidth of its mobile communication network with the electronic device. Accordingly, the network sharing configuration can be switched easily. In an embodiment, all of the configuration setting can be completed on the electronic device remotely without involving any manipulation on the mobile electronic device.

Figure 1:
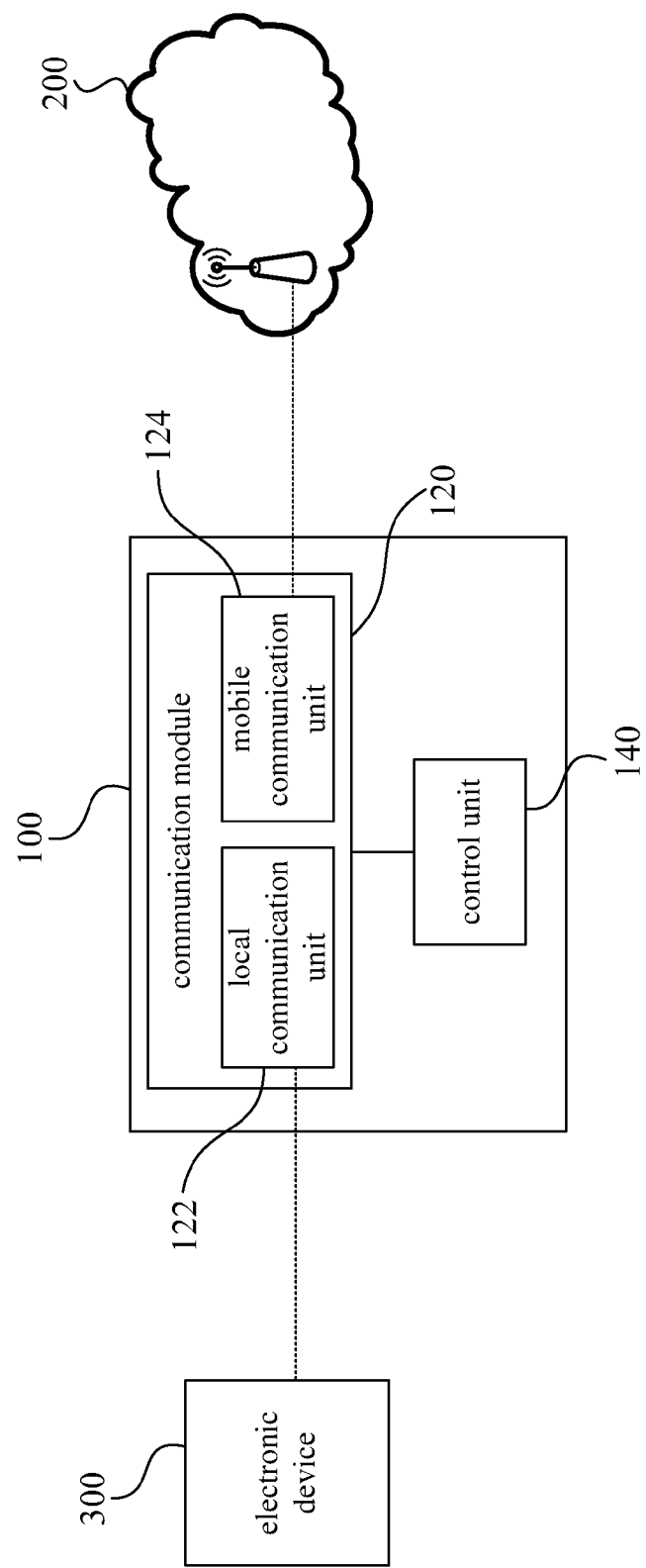
FIG. 1 is a function block diagram illustrating a mobile communication device according to an embodiment of the invention.

Please refer to FIG. 1. FIG. 1 is a function block diagram illustrating a mobile communication device 100 according to an embodiment of the invention. As shown in FIG. 1, the mobile communication device 100 includes a communication module 120 and a control unit 140. In practical applications, the mobile communication device 100 can be, but not limited to, a mobile phone, a smart phone, a mobile internet device (MID) or a personal digital assistant (PDA). The communication module 120 of the mobile communication device 100 includes a local communication unit 122 and a mobile communication unit 124.

The mobile communication unit 124 can be configured for connecting to a mobile communication network. For example, the mobile communication unit 124 establishes a connection to a telecommunication station for linking the mobile communication device 100 to the internet 200. The mobile communication network can be based on 2G mobile communication technology, 3G mobile communication technology, 3.5 mobile communication technology or 4G mobile communication technology. For example, the mobile communication network can be based on General Packet Radio Service (GPRS), Code Division Multiple Access (CDMA), High Speed Downlink Packet Access (HSDPA) or other equivalent mobile network technology. In the embodiment, the mobile communication unit 124 is not limited to adopt a specific mobile network technology.

On the other hand, the local communication unit 122 of the mobile communication device 100 is configured for establishing a local communication network. In the embodiment, the local communication network may be based on Wireless Fidelity (Wi-Fi) communication technology, but the invention is not limited to this.

The local communication unit 122 (e.g. a Wi-Fi communication unit) of the mobile communication device 100 has a passive mode and an active mode. The passive mode of the local communication unit 122 means that the local communication unit 122 operates as a client terminal, which may connect to the internet through other internet hub, router, or wireless network station. The active mode of the local communication unit 122 means that the local communication unit 122 operates as a server terminal, and in this case, the mobile communication device 100 may serve as a wireless access point (AP) equivalently.

The control unit 140 is coupled to the communication module 120. In practical applications, the local communication unit 122 of the mobile communication device 100 is normally configured to operate under a passive client mode in default in order to prevent unnecessary power consumption. In the invention, when the local communication unit 122 of the mobile communication device 100 receives a specific trigger signal from the electronic device 300 (e.g. a notebook computer manipulated by the user), the control unit 140 will switch the local communication unit 122 into the active mode automatically.

In practical applications, the local communication unit 122 under the passive mode receives the trigger signal from the electronic device 300 via a point-to-point connection. In the point-to-point connection, the mobile communication device 100 and the electronic device 300 may refer to a fixed network hardware address for exchanging information. For example, the mobile communication device 100 in the embodiment may establish the point-to-point connection (e.g. Ad Hoc connection) to the electronic device 300 according to a Media Access Control (MAC) address of the electronic device 300. In practical applications, the mobile communication device 100 and the electronic device 300 can be paired up in advance for acquiring the MAC address of each other.

For example, the point-to-point connection can be an Ad Hoc connection under the Wi-Fi protocol. The trigger signal in the embodiment can be a Wi-Fi packet. Content of the Wi-Fi packet includes a specific Service set identifier (SSID). For example, the SSID of the Wi-Fi packet may include a string of "Trigger Hotspot".

When the local communication unit 122 of the mobile communication device 100 receives the specific trigger signal, the control unit 140 will switch the local communication unit 122 into the active mode automatically. In other words, the local communication unit 122 is switched into a wireless network server mode. In this case, the mobile communication device 100 is equivalently served as a wireless access point (AP). Accordingly, the mobile communication device 100 may share its mobile network bandwidth with the electronic device 300 via the local communication network. In other words, the electronic device 300 is connected to the mobile communication network through the local communication unit 122 and the mobile communication unit 124 of the mobile communication device 100.

In other words, when the mobile communication device 100 receives the specific trigger signal, the control unit 140 will switch the local communication unit 122 into the active mode, so as to complete the configuration procedure for network sharing. For example, when the user is manipulating a notebook computer (i.e. the electronic device 300) in the living room, the user may send the trigger signal through the notebook compute, so as to activate the network sharing function of a mobile phone (i.e. the mobile communication device 100) in the bed room directly. Afterward, the mobile communication device 100 can be utilized as a wireless AP, such that the electronic device 300 is connected through the mobile communication device 100 to the mobile communication network and further to the internet 200.

Figure 2:
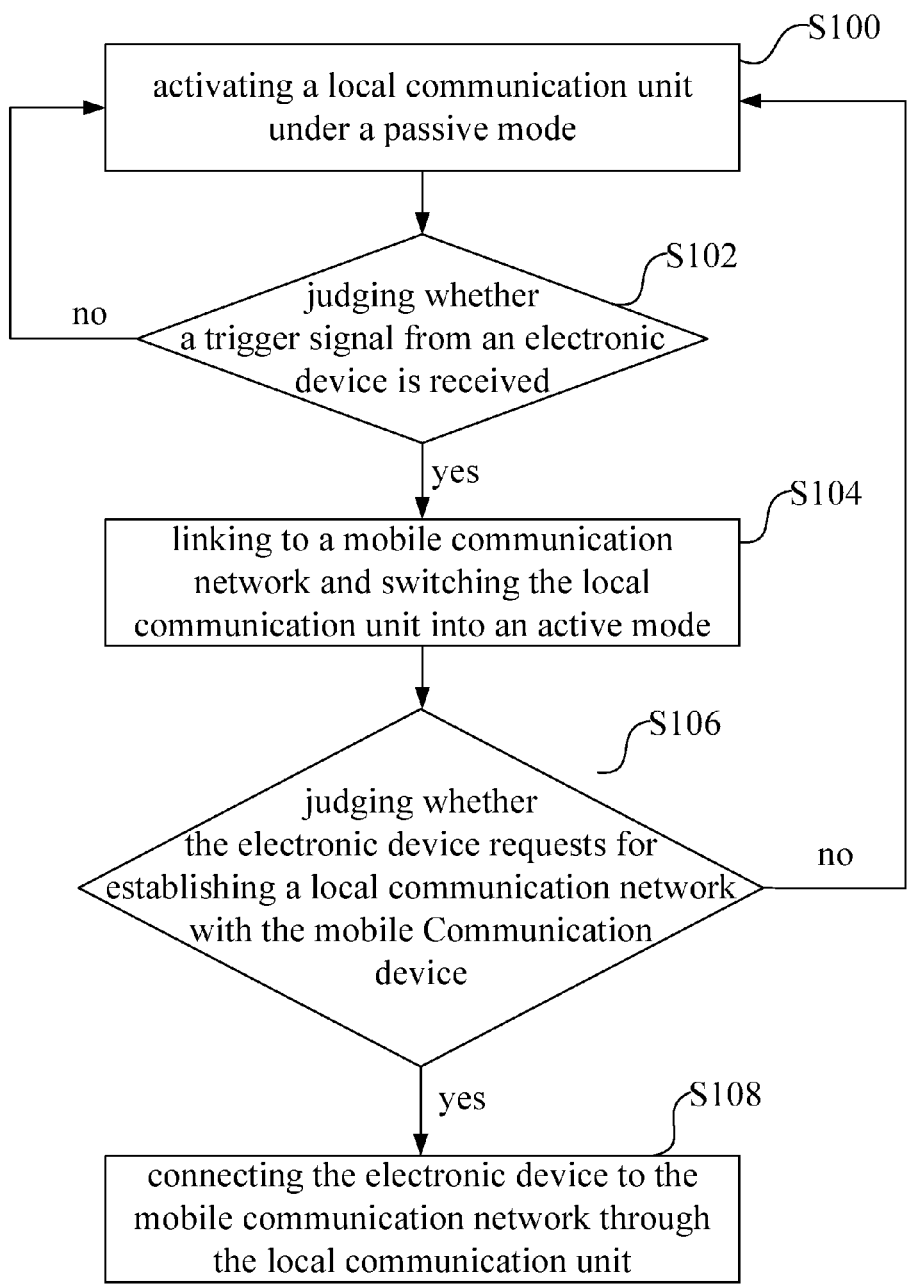
FIG. 2 is a flow chart illustrating a mobile network sharing method according to an embodiment of the invention.

Please refer to FIG. 2. FIG. 2 is a flow chart illustrating a mobile network sharing method according to an embodiment of the invention. The mobile network sharing method is suitable for applying on the mobile communication device 100 in FIG. 1.

As shown in FIG. 2, step S100 of the mobile network sharing method is performed firstly for activating a local communication unit of the mobile communication device 100 under a passive mode.

Afterward, step S102 is performed, such that the mobile communication device 100 judges whether a trigger signal from an electronic device 300 is received through the local communication unit under the passive mode. The local communication unit can be a Wi-Fi module based on Wireless Fidelity (Wi-Fi) communication technology.

In practical applications, the local communication network in step S102 between the mobile communication device 100 and the electronic device 300 is based on a point-to-point connection (e.g. Ad Hoc connection) between two devices. The trigger signal in the embodiment can be a Wi-Fi packet. Content of the Wi-Fi packet includes a specific Service set identifier (SSID). In the embodiment, the mobile communication device 100 may establish the point-to-point connection (e.g. Ad Hoc connection) to the electronic device 300 according to a Media Access Control (MAC) address of the electronic device 300. In practical applications, the mobile communication device 100 and the electronic device 300 can be paired up in advance for acquiring the MAC address of each other.

If not receiving the trigger signal, the mobile communication device 100 will return to perform step S100 and stay in the passive mode. On the other hand, if receiving the trigger signal, step S104 of the mobile network sharing method is performed for linking the mobile communication device 100 to the mobile communication network and switching the local communication unit of the mobile communication device 100 into the active mode.

Afterward, step S106 is performed for judging whether the electronic device 300 requests for establishing a local communication network with the mobile communication device 100.

If the electronic device 300 does not request for establishing the local communication network with the mobile communication device 100 within a specific period of time, the mobile communication device 100 may perform step S100 for switching the local communication unit back to the passive mode.

If the electronic device 300 requests for establishing a local communication network with the mobile communication device 100, step S108 is performed for connecting the electronic device 300 to the mobile communication network through the local communication unit of the mobile communication device 100.

The internal structures and operational theory of the mobile communication device 100 is disclosed in aforesaid embodiment of the invention, not to be repeated again. Please refer to the detail descriptions and FIG. 1.

Figure 3:
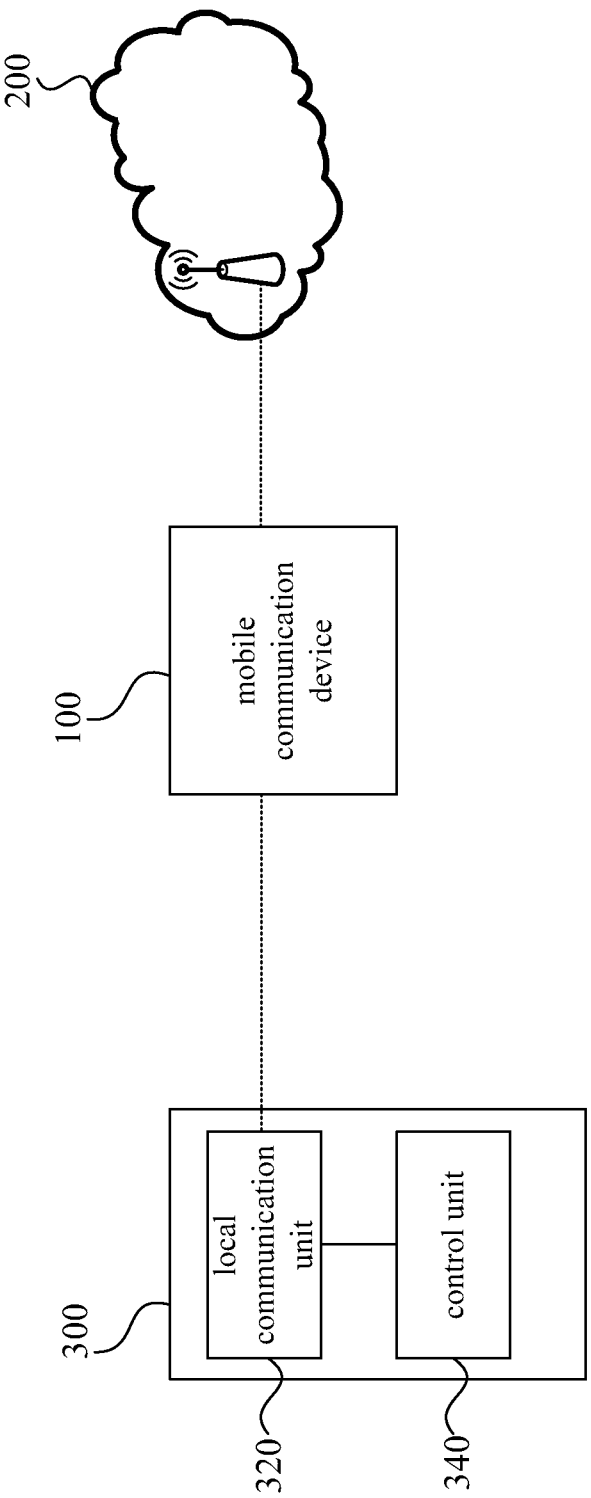
FIG. 3 is a function block diagram illustrating an electronic device according to an embodiment of the invention.
Figure 4:
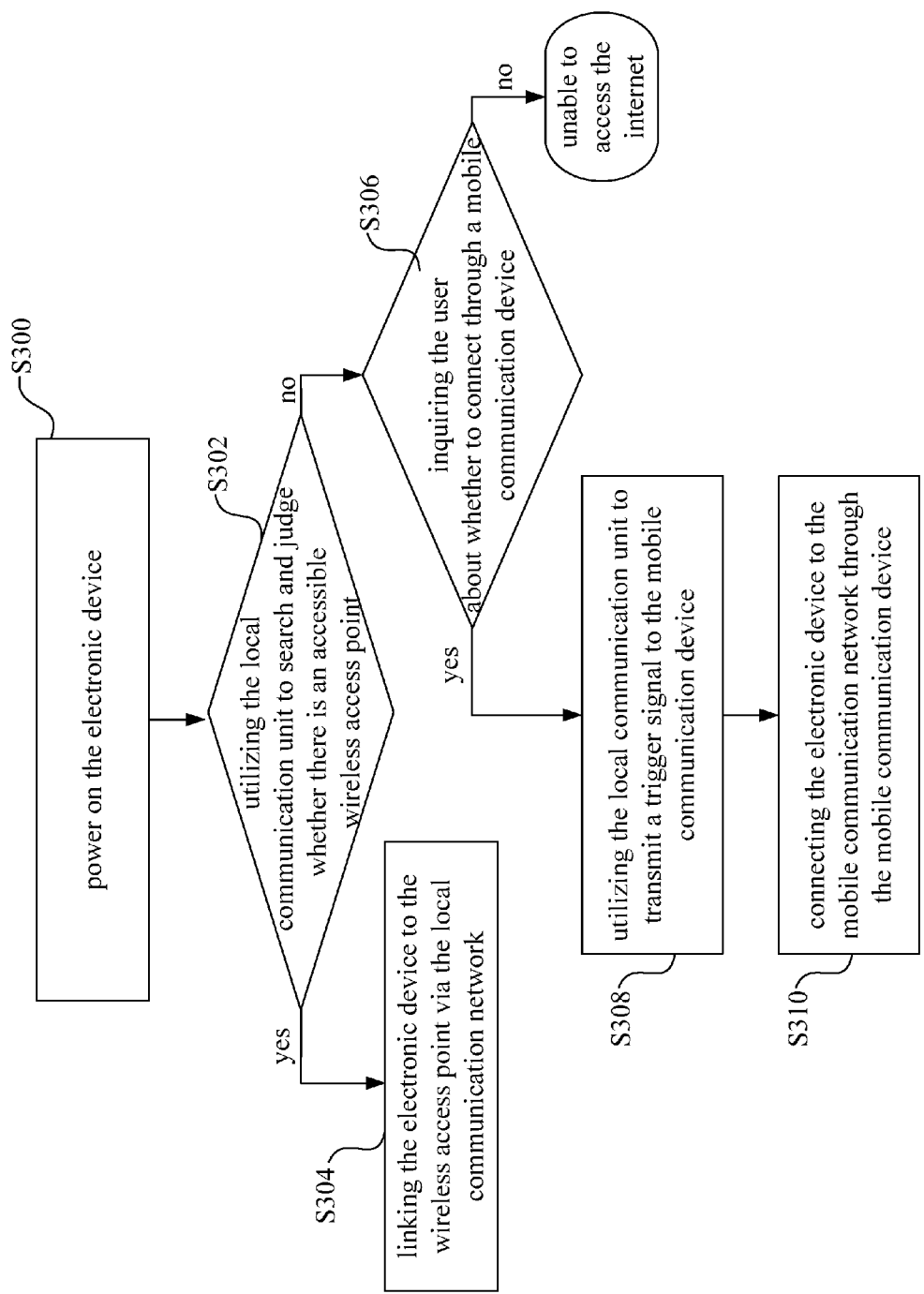
FIG. 4 is a schematic diagram illustrating a flow chart applied on the electronic device in a practical application.

On the other hand, please refer to FIG. 3 and FIG. 4. FIG. 3 is a function block diagram illustrating an electronic device 300 according to an embodiment of the invention. FIG. 4 is a schematic diagram illustrating a flow chart applied on the electronic device 300 in a practical application. In the embodiment, the electronic device 300 may cooperate with the mobile communication device 100 in aforesaid embodiment. In practical applications, the electronic device 300 can be a notebook computer, a handheld smart device, a tablet computer or any other equivalent computer/device.

As shown in FIG. 3, the electronic device 300 includes a local communication unit 320 and a control unit 340. The control unit 340 of the electronic device 300 is coupled with the local communication unit 320.

The local communication unit 320 of the electronic device 300 is configured for establishing a local communication network. In the embodiment, the local communication network can be based on a Wi-Fi technology, but the invention is not limited to this.

As shown in figures, the user may power on the electronic device 300 in step S300.

Afterward, in step S302, the control unit 340 of the electronic device 300 utilizes the local communication unit 320 to search for valid wireless access point in the neighborhood, and further to judge whether the wireless access point in the neighborhood is accessible.

When the electronic device 300 determines that there is a valid wireless access point existed in the neighborhood, step S304 is performed for linking the electronic device 300 to the wireless access point via the local communication network, and utilizing the wireless access point as a redirect-gateway for connecting to the internet.

When the electronic device 300 determines that there is no valid wireless access point existed in the neighborhood in step S302, step S06 is performed to inquire the user by displaying a confirmation notice on the interface of the electronic device 300 about whether to connect through a mobile communication device. If the user does not want to connect through the mobile communication device, the electronic device 300 is not able to access the internet.

If the user attempts to establish a connection through the mobile communication device, step S308 is performed, such that the control unit 340 of the electronic device 300 may utilize the local communication unit 320 to transmit a trigger signal to the mobile communication device (please refer to the mobile communication device 100 in FIG. 1). The trigger signal is configured for triggering the mobile communication device to enable its network sharing function, e.g. switching the local communication unit of the mobile communication device from a passive mode into an active mode. Please refer to aforesaid embodiment for detail descriptions of steps.

Afterward, step S310 is performed to enable the electronic device 300 for connecting to the mobile communication network through the mobile communication device (please refer to the mobile communication device 100 in FIG. 1). In the embodiment, the electronic device 300 is connected to the mobile communication device via the local communication network, such that the electronic device 300 may share the bandwidth of the mobile communication network of the mobile communication device, and further to access the internet.

Therefore, when the user attempts to access the wireless network, the user may manipulate the electronic device, e.g. a notebook computer, a handheld smart device or a tablet computer, to search for a valid wireless access point. If there is no valid wireless access point around, the electronic may send a specific trigger signal to the mobile communication device via a local communication network. When the mobile communication device receives the trigger signal, the mobile communication device is switched into an active mode for sharing the bandwidth of its mobile communication network with the electronic device. Accordingly, the network sharing configuration can be switched easily. Even when the electronic device and the mobile communication device are located in different places, the configuration setting can be completed on the electronic device remotely without involving any manipulation on the mobile electronic device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A mobile communication device, comprising:
   a communication module comprising:
      a mobile communication unit for connecting to a mobile communication network; and
      a local communication unit, having a passive mode and an active mode, the local communication unit in the passive mode operating to be connected to the Internet through other devices, the local communication unit in the active mode operating to be connected to the Internet directly; and
   a control unit coupled with the communication module, after a trigger signal from an electronic device other than the mobile communication device is received by the local communication unit under the passive mode and the local communication unit under the passive mode directly communicates with the electronic device, the control unit switching the local communication unit into the active mode, so as to connect the electronic device to the mobile communication network through the local communication unit and the mobile communication unit, wherein the mobile communication device establishes a point-to-point connection to the electronic device according to a Media Access Control (MAC) address of the electronic device.

2. The mobile communication device of claim 1, wherein the local communication unit under the passive mode receives the trigger signal from the electronic device via the point-to-point connection.

3. The mobile communication device of claim 2, wherein the point-to-point connection comprises an Ad Hoc connection.

4. The mobile communication device of claim 1, wherein the mobile communication network is based on 2G mobile communication technology, 3G mobile communication technology, 3.5 mobile communication technology or 4G mobile communication technology.

5. The mobile communication device of claim 1, wherein the local communication unit is based on Wireless Fidelity (Wi-Fi) communication technology.

6. The mobile communication device of claim 5, wherein the trigger signal is a Wi-Fi packet, and the Wi-Fi packet comprises a specific Service Set Identifier (SSID).

7. The mobile communication device of claim 1, wherein the mobile communication device is equivalently served as a wireless access point (AP) when the local communication unit is under the active mode.

8. A mobile network sharing method, suitable for a mobile communication device comprising a communication module, the mobile network sharing method comprising:
   activating, by a control unit coupled with the communication module, a local communication unit under a passive mode, the local communication unit in the passive mode operating to be connected to the Internet through other devices;
   judging, by the control unit, whether a trigger signal from an electronic device is received through the local communication unit under the passive mode, wherein the local communication unit under the passive mode directly communicates with the electronic device;
   linking, by a mobile communication unit, to a mobile communication network and switching, by the control unit, the local communication unit into an active mode when the trigger signal is received, the local communication unit in the active mode operating to be connected to the Internet directly; and
   connecting, by the control unit, the electronic device to the mobile communication network through the local communication unit, wherein a point-to-point connection to the electronic device is established according to a Media Access Control (MAC) address of the electronic device.

9. The mobile network sharing method of claim 8, wherein in the step of receiving the trigger signal through the local communication unit, the mobile communication device receives the trigger signal via the point-to-point connection.

10. The mobile network sharing method of claim 9, wherein the point-to-point connection comprises an Ad Hoc connection.

11. The mobile network sharing method of claim 8, wherein the mobile communication network is based on 2G mobile communication technology, 3G mobile communication technology, 3.5 mobile communication technology or 4G mobile communication technology.

12. The mobile network sharing method of claim 8, wherein the local communication unit is based on Wireless Fidelity (Wi-Fi) communication technology.

13. The mobile network sharing method of claim 8, wherein the trigger signal is a Wi-Fi packet, and the Wi-Fi packet comprises a specific Service Set Identifier (SSID).

* * * * *